(12) United States Patent
Burgess et al.

(10) Patent No.: US 11,947,640 B2
(45) Date of Patent: Apr. 2, 2024

(54) ADAPTIVE, MULTI-CHANNEL, EMBEDDED APPLICATION PROGRAMMING INTERFACE (API)

(71) Applicant: Bank of America Corporation, Charlotte, NC (US)

(72) Inventors: Patrick Burgess, Stockholm (SE); Trish Gillis, Chicago, IL (US); Taylor Farris, Hoboken, NJ (US); Napangsiri Wanpen, New York, NY (US)

(73) Assignee: Bank of America Corporation, Charlotte, NC (US)

( * ) Notice: Subject to any disclaimer, the term of this patent is extended or adjusted under 35 U.S.C. 154(b) by 399 days.

(21) Appl. No.: 17/372,734

(22) Filed: Jul. 12, 2021

(65) Prior Publication Data

US 2023/0010578 A1      Jan. 12, 2023

(51) Int. Cl.
*G06F 21/31*      (2013.01)
*G06F 9/54*       (2006.01)

(52) U.S. Cl.
CPC .............. *G06F 21/31* (2013.01); *G06F 9/542* (2013.01)

(58) Field of Classification Search
CPC ................................ G06F 21/31; G06F 9/542
See application file for complete search history.

(56) References Cited

U.S. PATENT DOCUMENTS

| | | | |
|---|---|---|---|
| 7,885,870 B2 | 2/2011 | Nam et al. | |
| 2010/0197293 A1* | 8/2010 | Shem-Tov | H04L 63/08 455/420 |
| 2014/0109072 A1* | 4/2014 | Lang | G06F 21/53 717/168 |
| 2014/0372509 A1* | 12/2014 | Fausak | H04L 67/02 709/203 |
| 2015/0163206 A1* | 6/2015 | McCarthy | H04L 63/104 726/4 |
| 2015/0244835 A1* | 8/2015 | Fausak | H04L 67/04 709/203 |
| 2016/0092173 A1* | 3/2016 | Rodrigues | H04L 67/00 717/106 |
| 2018/0285172 A1* | 10/2018 | Turner | G06F 21/606 |
| 2020/0175154 A1 | 6/2020 | Ratnakaram et al. | |
| 2022/0091913 A1* | 3/2022 | Warmack | G06F 9/547 |
| 2022/0272159 A1* | 8/2022 | Samuel | G06Q 30/04 |

(Continued)

*Primary Examiner* — Stephen T Gundry
(74) *Attorney, Agent, or Firm* — Weiss & Arons LLP

(57) ABSTRACT

A mobile device configured for communication with a multi-channel, operating-system (OS)-agnostic application programming interface (API) is provided. The API is configured to provide generic access to an OS-agnostic-device API output. The API may be coupled to a library of user credentials, and a library of data. The data provides information for one or more responses to a request from the user. The device may include an OS-based application and a translator. The translator translates communications between the OS-based application and said OS-agnostic API. The translator may convert an OS-compliant message header to a generic message header and to convert a generic message header to an OS-compliant message header. The OS-agnostic API may receive a communication initiation from the device. The device may be associated with a first channel. The API may request and receive 1) user credentials associated with the device and 2) data, authenticate the user credentials, and pull the data.

6 Claims, 9 Drawing Sheets

(56) References Cited

U.S. PATENT DOCUMENTS

| | | | | |
|---|---|---|---|---|
| 2022/0276917 A1* | 9/2022 | Carr, Jr. | | G06F 8/65 |
| 2022/0283886 A1* | 9/2022 | Brown | | H04L 9/3247 |
| 2022/0291979 A1* | 9/2022 | Martin | | H04W 4/50 |
| 2022/0303268 A1* | 9/2022 | Karnaros | | G06F 21/36 |
| 2022/0342734 A1* | 10/2022 | Kennedy, Jr. | | H04L 67/02 |
| 2022/0366410 A1* | 11/2022 | Rule | | G06Q 20/3223 |
| 2022/0394039 A1* | 12/2022 | Deodurg | | H04L 63/102 |
| 2022/0407861 A1* | 12/2022 | Beecham | | H04L 63/102 |
| 2023/0067552 A1* | 3/2023 | Caudill | | G06F 9/54 |
| 2023/0110275 A1* | 4/2023 | Litichever | | G06F 13/107 |
| | | | | 710/62 |

* cited by examiner

ADAPTIVE, MULTI-CHANNEL, EMBEDDED APPLICATION PROGRAMMING INTERFACE (API)

FIELD OF TECHNOLOGY

Aspects of the disclosure relate to computer systems. Specifically, aspects of the disclosure relate to systems and methods for increasing connectivity and productivity across multiple electronic communication channels.

BACKGROUND OF THE DISCLOSURE

For the purposes of this application, an API should be understood to be a set of definitions and protocols for building and integrating application software. APIs enable a product or service to communicate without having to know how the information communicated by the API is implemented.

Specifically, APIs represent a protocol between communicating parties. For example, APIs can simplify how developers integrate new application components into an existing architecture.

APIs are a simplified way to connect to infrastructure through cloud-native app development, but they also enable sharing data with customers and other external users.

More importantly, APIs enable access to external users, while maintaining security and control. Controls extend to how access is opened and to whom. API management, which enforces API security, can include the use of an API gateway. Connecting to APIs, and creating applications that consume the data or functionality exposed by APIs, can be done with a distributed integration platform that connects substantially everything involved with the API. This may include legacy systems, and various components of the Internet of Things (IoT).

It would be desirable to leverage such an API to increase connectivity with an application, as well as productivity, across multiple electronic communication channels.

SUMMARY OF THE DISCLOSURE

A method for conducting an electronic communication between a multi-channel, embedded application programming interface (API) and a device is provided. The API provides adaptive access across multiple channels.

The API preferably includes a library of operating system (OS) communication protocols. Each of the OS protocols corresponds to a single one of the multiple channels. The API also preferably includes a library of user credentials for use in verifying the authenticity of a user attempting to log in via one of the multiple channels. The API also includes a library of data. The data includes information for one or more responses to a request from the user. The provision of data preferably occurs after verification of the authenticity of the user. The provision of data can, in certain embodiments, be initiated prior to the verification of the authenticity of the user.

The method may include receiving, at the API, a communication initiation from the device associated with the user. In some embodiments, it should be noted that the device is associated with a first channel among the multiple channels.

The method may also include requesting, using the API, an OS format associated with the device and user credentials associated with the device.

Thereafter, the method may include receiving a response from the device. The response may include a device OS format, the credentials associated with the device and a data request.

The method may further include accessing, using the API, the library of OS communication protocols to retrieve a protocol that corresponds to the OS format; authenticating the user credentials; and, following the authenticating, pulling the requested data. Thereafter, the method may call for formatting the pulled data in the OS format to form OS formatted data. Finally, the method may provide the OS formatted data to the device.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
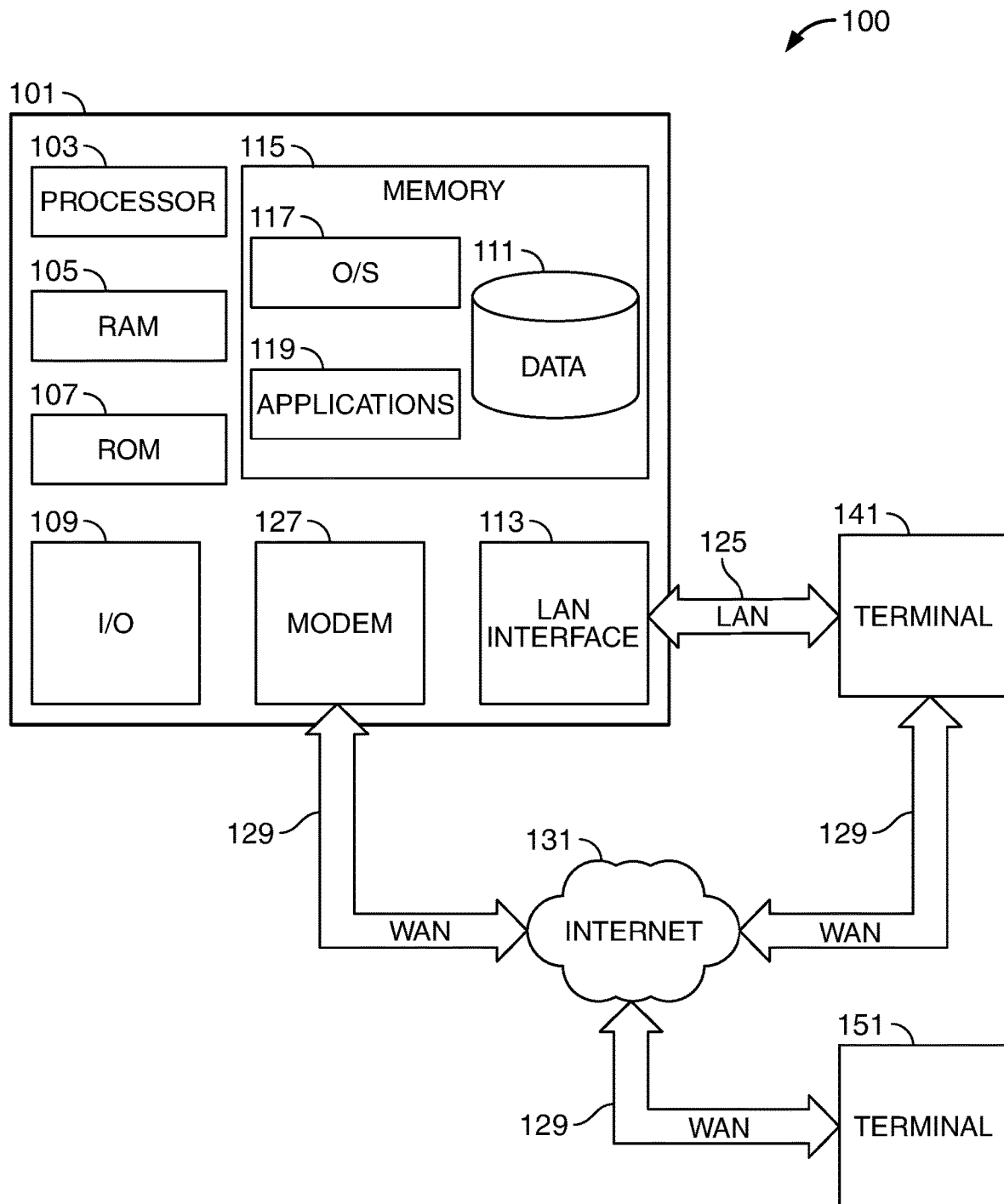
FIG. 1 shows an illustrative block diagram of a system for in accordance with principles of the disclosure.

In one example for use according to the invention, an API may be utilized by a distribution company. The distributor may elect to provide its customers with an app that enable checking of item availability with the distributor. This app could be expensive to develop, limited by platform, and require long development times and ongoing maintenance.

Alternatively, the distributor could provide an API to check stock availability. There are several benefits to this approach. Such an approach enables customers to access data via an API and helps them aggregate information about their inventory in a single place. It should be noted that access to the API, according to the current disclosure, may in certain embodiments, involve passwords, one-time-use (OTU) passwords, tokens, biometrics or any suitable combination of the foregoing.

The distributor can make changes to its internal systems without impacting customers. Also, with a publicly available API, developers working for the distributor, resellers or third parties could develop an app to help customers find items in inventory. This advances customer interactions and can reduce interaction overhead.

A multi-channel, embedded application programming interface (API) is provided. The API provides adaptive access across multiple channels. The API preferably includes a library of operating system (OS) communication protocols. Each of the OS protocols preferably corresponds to a single one of the multiple channels. The API also preferably includes a library of user credentials for verifying the authenticity of a user attempting to log in via one of the multiple channels.

In addition, the API includes a library of data. The data in the library provides information for one or more responses to a request from the user, following verification of the authenticity of the user.

The API is preferably configured to receive a communication initiation from a device associated with the user. The device may be associated with a first channel among the multiple channels. The API may request an identification of an OS format associated with the device and user credentials associated with the device. The API may receive a response comprising a device OS format, credentials associated with the device and a data request. The API may access the library of OS communication protocols to retrieve a protocol that corresponds to the OS format. The API may authenticate the user credentials, pull the requested data, format the pulled data in the OS format, and provide the OS-formatted data to the device.

In some embodiments, in response to the user terminating an API access on a first device and maintaining use of a second device, the API may preferably transition to providing user API access from the second device. This may occur either 1) when the user requests API access from the second device or 2) automatically (preferably upon detection and registration of the user's activity at the second device.)

In certain embodiments, the API may be further configured to maintain API access from a first user device simultaneous to maintaining API access from a second user device. Preferably, each of the first user device and the second user device can be associated with the single user. In some embodiments, each of the first user device and the second user device are not associated with a single user.

In some embodiments, the API may be further configured to terminate API access from a first user device in response to receiving an initiation communication from a second user device or in response to a dearth of activity at the first user device.

In some embodiments, the API may be further configured to terminate API access from a first user device in response to granting API access to a second user device. In this embodiment, each of the first user device and the second user device may be associated with the single user.

In certain embodiments, the API may be further configured to support communication between a first API instance and a second API instance. The first API instance may be associated with a first user device and the second API instance associated with a second user device. In some of these embodiments, each of the first user device and the second user device can be associated with the single user. In others, each of the first user device and the second user device may not be associated with a single user.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related to performing various tasks. The various tasks may be related to interactive, cross-channel, API communication.

Computer 101 and/or terminals 141 and 151 may also be devices including various other components, such as a battery, speaker, and/or antennas (not shown).

Terminal 151 and/or terminal 111 may be portable devices such as a laptop, cell phone, Blackberry™, tablet, smartphone, or any other suitable device for receiving, storing, transmitting and/or displaying relevant information. Terminals 151 and/or terminal 111 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices. It should be noted that such modules may be considered, for the purposes of this application, as engines with respect to the performance of the particular tasks to which the modules are assigned.

Figure 2:
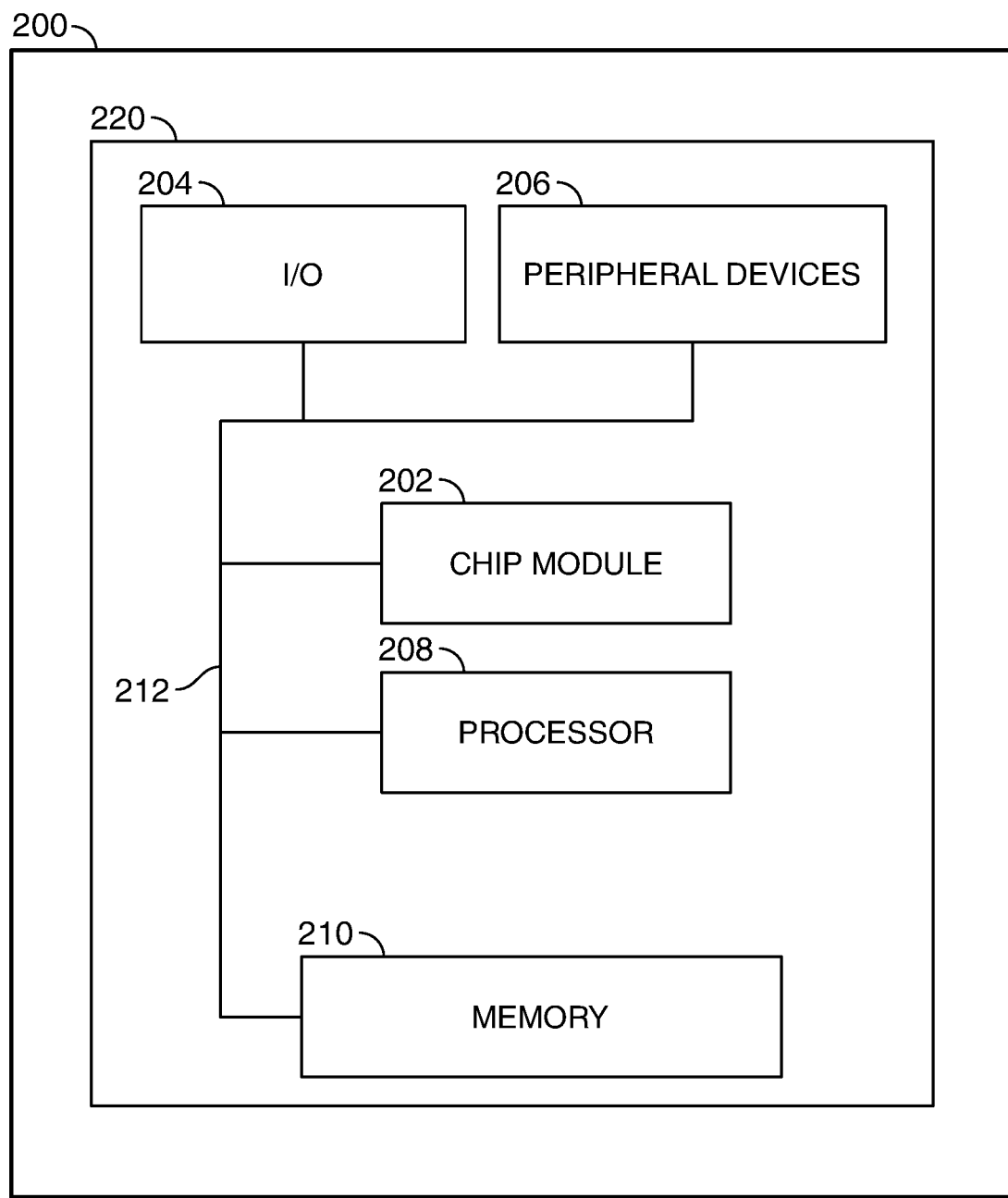
FIG. 2 shows illustrative apparatus that may be configured in accordance with the principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
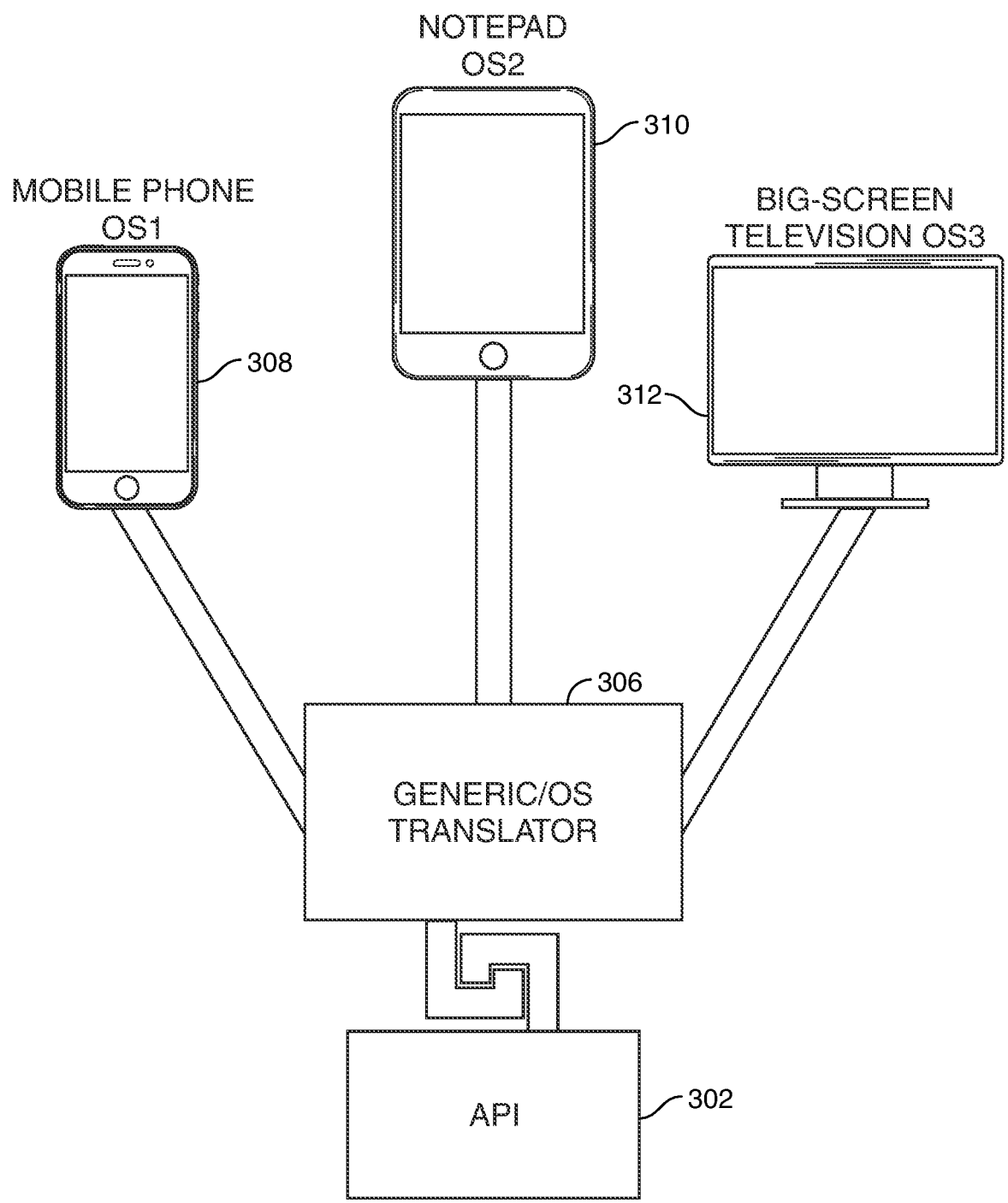
FIG. 3 shows an illustrative schematic diagram of a system according to the disclosure.

FIG. 3 shows an illustrative schematic diagram of a system according to the disclosure. Application Programming Interface (API) 302 is shown at the bottom of FIG. 3. API 302 may be understood, for the purposes of this application, to represent an interface that, in one embodiment, supports communication between a server-based application and a remote instance of the application.

In the embodiment shown in FIG. 3—API 302 supports communication with one or more endpoints of communication channels such as a mobile phone 308, a notepad 310 and a big-screen television 312. Typically, mobile phone 308 runs a first operating system OS1, notepad 310 runs a second operating system OS2, and big-screen television runs a third operating system OS3.

API 302 is configured to support communication with all three of mobile phone 308, notepad 310 and big-screen television 312. For example, if a server-based application resides on a server—the server may use API 302 to request information from any of mobile phone 308, notepad 310 and big-screen television 312. Alternatively, API 302 may communicate, to an application resident on a server, a request from any of mobile phone 308, notepad 310 and/or big-screen television 312.

One issue that arises with the foregoing requests—and responses to same, involves the translation between the API and the operating systems located at mobile phone 308, notepad 310 and big-screen television 312. Typically, an API communicates at the server level—and each of mobile phone 308, notepad 310 and big-screen television 312 communicate at a level that corresponds to each operating system that corresponds to each of mobile phone 308, notepad 310 and big-screen television 312. As such, there exist a need to connect between the language at the API level and the language at mobile phone 308, notepad 310 and big-screen television 312. A generic translator 306 is shown a schematic solution to solve this problem.

Generic translator 306 preferably involves translation capabilities for bridging and connecting API 302 and mobile phone 308, notepad 310 and big-screen television 312.

Figure 4:
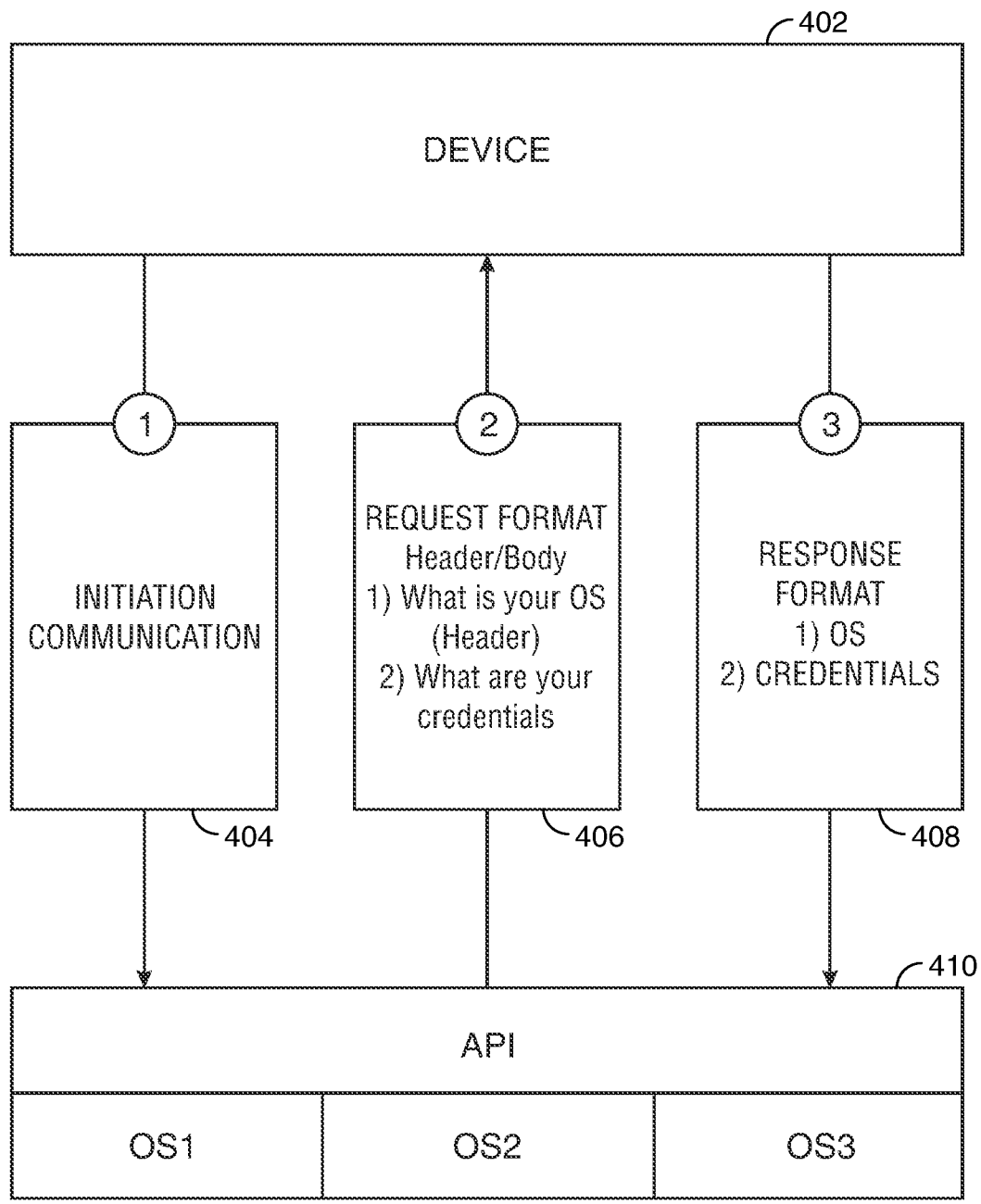
FIG. 4 shows another illustrative schematic diagram of a system according to the disclosure.

FIG. 4 shows another illustrative schematic diagram of a system according to the disclosure. The system various interactions between device 402 and API 402. Step 1 shows a device initiating communication with an API.

It should be noted that communication with API 408 can be initiated, as shown at 404, from device 402. Such an initiation may involve one of several different approaches and/or mechanisms.

For example, when device 402 is turned on, or unlocked using a password, token, biometric or other suitable key, communication with API 408 may be initiated by device 402. In other embodiments, a user may select to initiate communication from a device 402. In yet other embodiments, communication may be initiated based on system-set or user-defined parameters. The initiation of the communication from the device may include an API call to the extent the requirements of the API call are known, although the further back and forth between the device and the API might require additional translation.

In the system shown in FIG. 4, API 410 is configured to be adapted to communicate using protocols associated with OS1, OS2 or OS3. These operating systems correspond to, for example, mobile phone 308, notepad 310 and big-screen television 312 shown in FIG. 3. Alternatively, these operating correspond to any three suitable devices.

At step 2 of FIG. 4, a request from API 410 (in response 406 to the initiation of communication at 404) may include a request for an OS header as well as a request for individual security credentials associated with device 402 and/or the user associated with the device. The OS header request may be understood to request identification of the OS currently used by device 402.

At step 3, device 402 preferably responds to request 406 with a response 408 that identifies the OS associated with device 402 as well as security credentials associated with device 402 and/or security credentials associated with the user of device 402.

Following receipt of response 408, and validation of credentials included in response 408, API 410 can preferably communicate directly with device 402 using the identified OS. This direct communication relies on the fact that API 410 preferably includes a library of OS communication protocols. Upon receipt of the identification of the protocol associated with device 402, API 410 can preferably communicate directly using the OS identified by device 402 at step 3.

Figure 5:
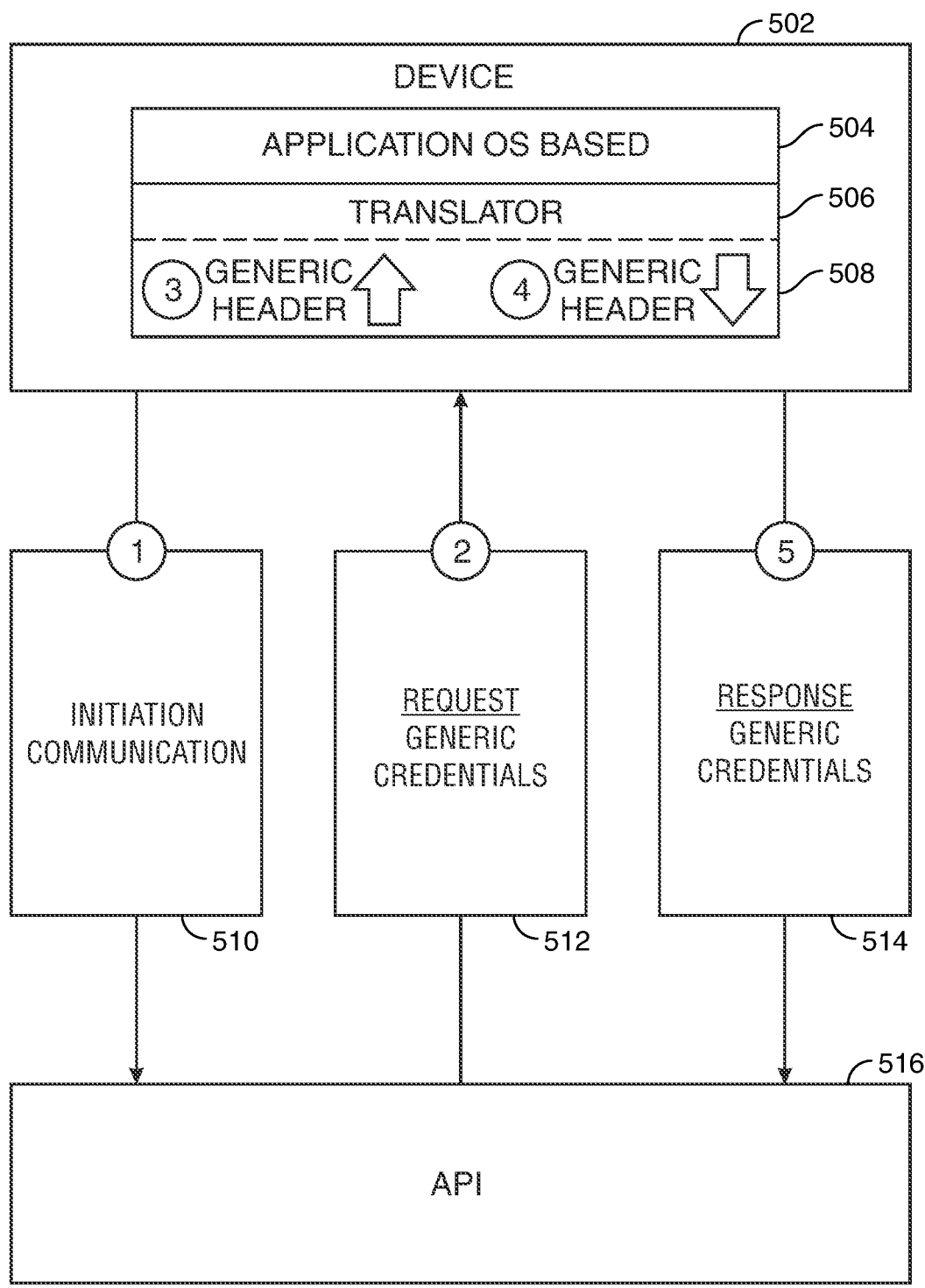
FIG. 5 shows yet another illustrative schematic diagram according to the principles of the disclosure.

FIG. 5 shows yet another illustrative schematic diagram according to the principles of the disclosure. Device 502 preferably comprises numerous layers 504, 506 and 508.

Layer 504 is preferably associated with an application which is OS-based. The OS can be any suitable OS for running device 502.

Layer 506 is a translator layer that forms part of device 502. I/O layer 508 is adapted for intake of a generic header (and payload—not shown) and output of a generic header (and payload—not shown). In this embodiment, API 516 preferably does not include a library of OS protocols.

Such an embodiment may include a generic initiation communication at step 1, as shown at 510. The initiation communication may have been generated in a generic format by device 502 using a client aspect of an OS-based application resident on device 502.

This OS-based application may have generated the initiation communication in the OS protocol which resides on device 502; translated the initiation communication using translator 506 and sent the generic header (and accompanying payload) as part of the initiation communication using I/O 508.

Thereafter, request for generic credentials occurs at 512 and response of generic credentials occurs at 514. In such an embodiment as the one shown in FIG. 5, the communications between device 502 and API 516 may preferably be conducted in a generic, non-device and non-OS specific, protocol.

Figure 6:
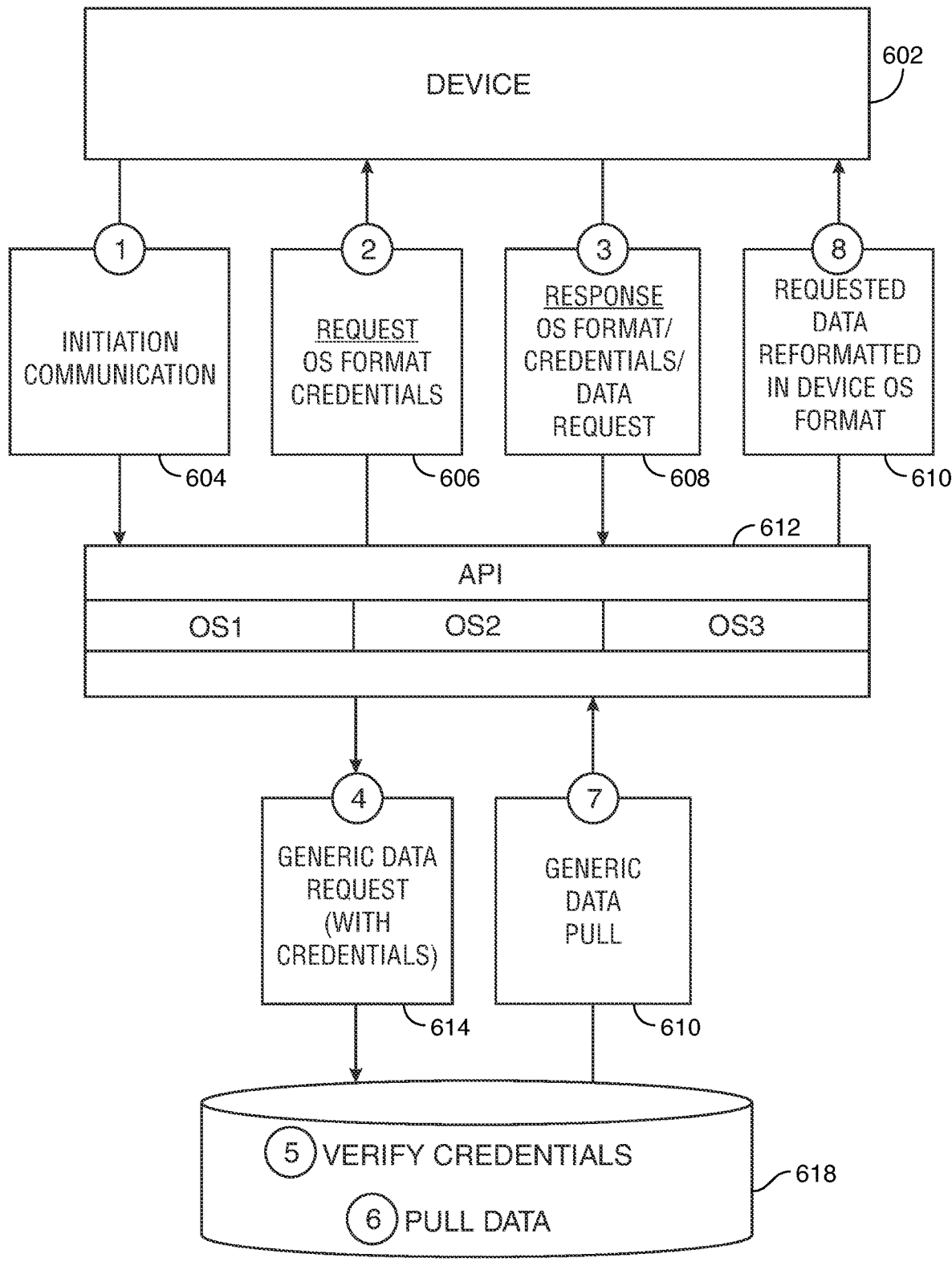
FIG. 6 shows still another illustrative schematic diagram according to the principles of the disclosure.

FIG. 6 shows still another illustrative schematic diagram according to the principles of the disclosure. It should be noted that the system shown in FIG. 6 preferably resembles the system of FIG. 4 with the added detail shown at steps 3-8 and more particularly at steps 4-7.

Device 602 is shown as initiating communication 604, at step 1, with API 612. At step 2, API 612 requests OS format and credentials 606 from device 602. Device 602, at step 3, responds 608 with OS format associated with device 602, credentials and data request.

At step 4, API 612 then requests data 614 from database 618. This request 614 preferably includes credentials.

At steps 5 and 6, database 618 preferably verifies credentials and pulls data, respectively. Thereafter, at step 7, database 618 transmits the results of the credential verification and data pull to API 612. Finally at step 8, API 612 transmits 610 the requested data as reformatted in the device-reflective OS format. In the approach shown in the embodiment detailed in FIG. 6, API 612 is preferably able to communicate with any device that includes an OS to which API 612 has access.

Figure 7:
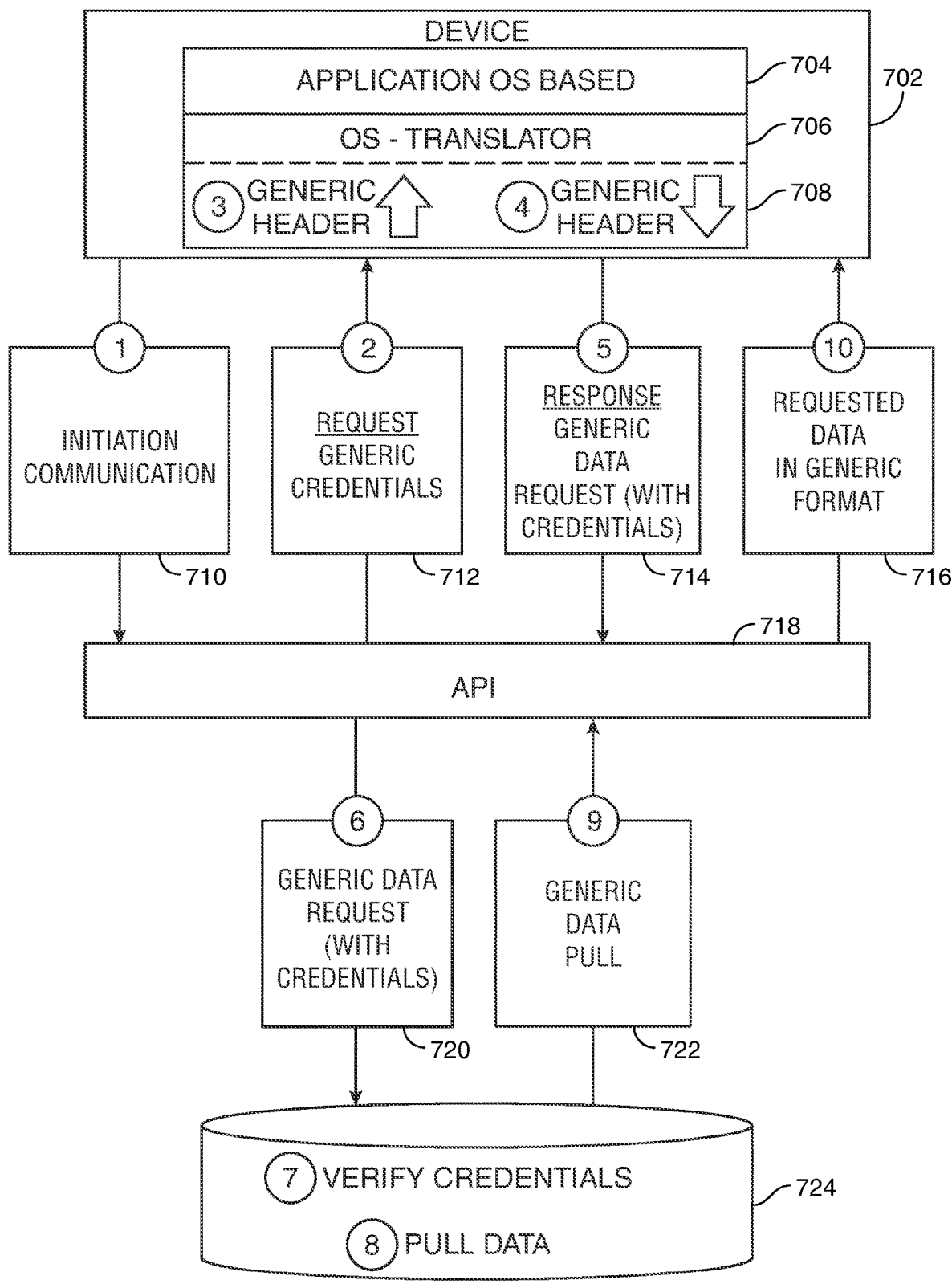
FIG. 7 shows but another illustrative schematic diagram according to the principles of the disclosure.

FIG. 7 shows but another illustrative schematic diagram according to the principles of the disclosure. FIG. 7 substantially reflects the disclosure of FIG. 5, but includes added detail.

Device 702 preferably includes an application that is OS based 704; and OS translator 706 and an I/O component 708.

At step 1, device 702 initiates, using I/O component 708, communication with API 718, at 710. Following receipt of the communication initiation, API preferably requests at step 2 generic credentials—i.e., credentials in a generic format or protocol. The request 712 is processed at step 3 because the request has a generic header which can be processed by device 702. Device 702 responds at step 4 with the requested information. The requested information preferably includes a generic header which can be processed by API 718.

Thereafter, at step 5, device 702 responds, at 714 using OS translator 706 and I/O component 708. Response 714 may be characterized as a generic data request that includes credentials associated with device 702.

Upon receipt of the generic data request (with credentials) at step 5, API 718 can preferably pass along, at step 6, the generic data request (with credentials) to database 724. Database 724, in conjunction with a processor (not shown), can then, at steps 7 and 8, verify the credentials and pull the requested data. Following the verification and data pull—the data is retrieved by API 718, as shown at step 9.

At step 10, the requested data in generic format may be transmitted 716 to device 702. Because device 702 has a translator layer 706, as well as an I/O component 708, that is configured to uptake such information as the requested data in generic format, at step 10, no other protocol matching would be required.

In one use of the methods and systems set forth herein, an application may reside on a mobile device or other remote device, and an API may enable connection between the device and a server. The API may include an API gateway that supports communication between the API and the device.

Figure 8:
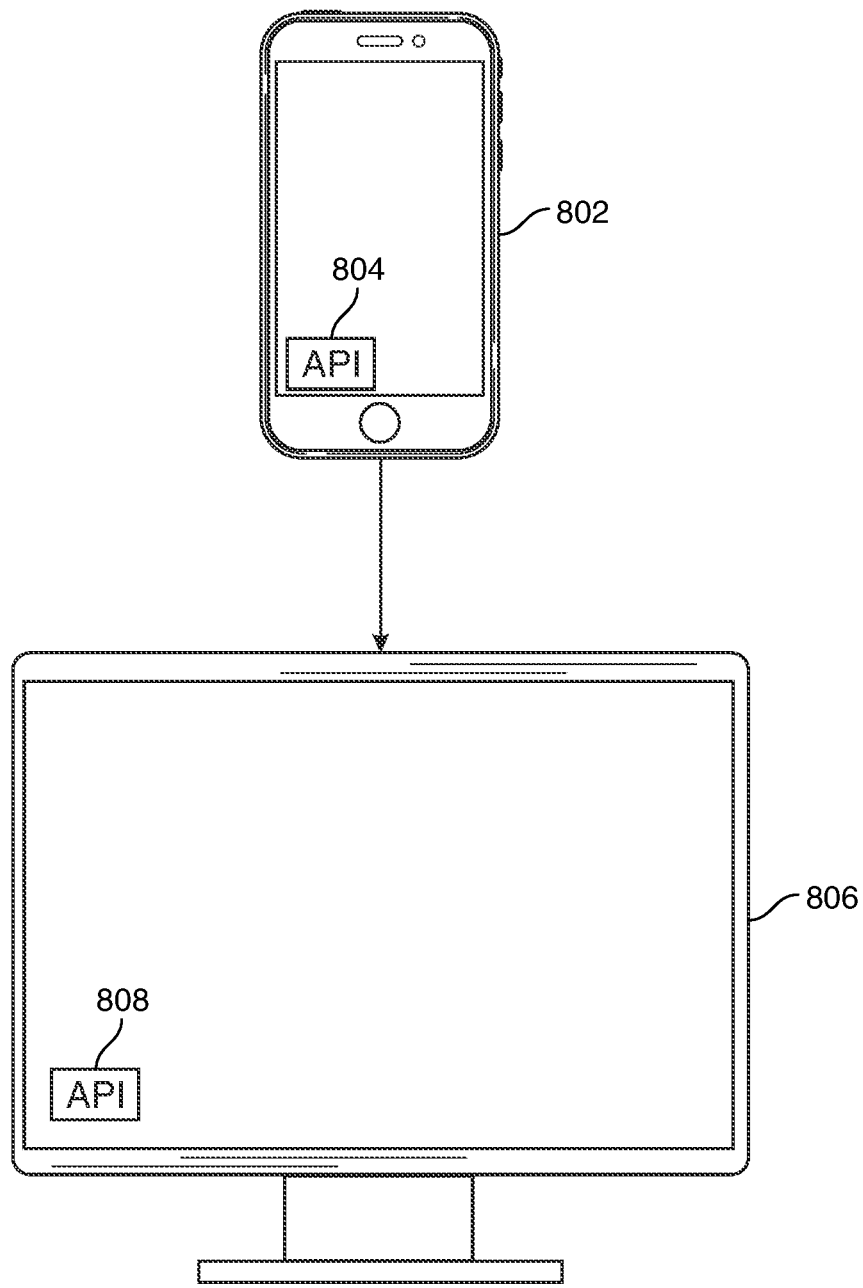
FIG. 8 shows another illustrative schematic diagram according to the principles of the disclosure.

In some embodiments, the methods and systems set forth herein may enable continued API access when a user transitions from one device to another. FIG. 8 shows a user API-enabled 804 on a mobile device 802.

Then, the user transitions to watching a big-screen television 806. In some embodiments, the methods and systems set forth herein may preferably seamlessly continue to enable the user following the transition—albeit on a different device. The continued enablement is shown at API 808.

One trigger for transitioning the API access from one device to another may involve user use, attention, biometric availability or other indicator of user focus on the second device. Such change of user focus may indicate to the system that the user has now stopped accessing the API, or being in a position to access the API, from a first device and is ready to access the API from a new device. In this fashion, the user can continue use of an API, or just enabled access to the API, from one device to the next. This seamless transition preferably reduces down-time in API access and increases security of API access by limiting the user access only to the devices on which the user is currently focusing.

In such embodiments, API access may preferably be linked to device access. As such, when the user accesses the device, the API automatically transitions to an operational state. In other embodiments, when the user accesses the device, the API may provide an opportunity to the user to enter an API operational state, but this state may be held dormant prior to the user electing to access the API operational state at the second device.

In other embodiments, the API access may not indeed be activated on each of the separate devices. Rather, the user may be required to activate the API access every time the user switches from one device to another. In certain of these embodiments, the user transfer may only act to close API access on the old device but not to renew API access on the new device.

Figure 9:
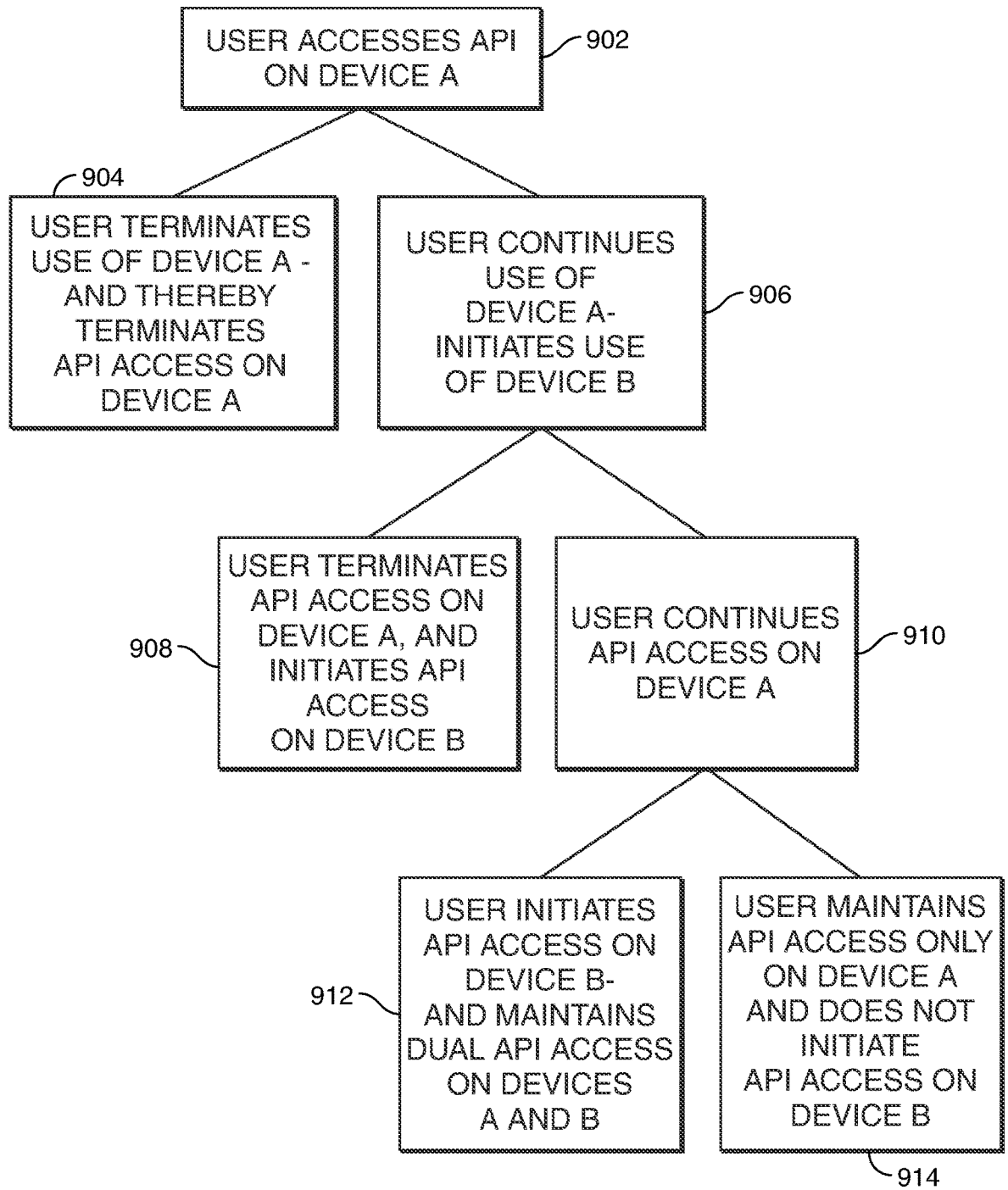
FIG. 9 shows an illustrative flow diagram according to the principles of the disclosure.

FIG. 9 shows an illustrative flow diagram according to the principles of the disclosure. Specifically, FIG. 9 shows various paths for user navigation of API access across various devious preferably designated by the user.

At 902, a user may access a device A. At 904 the user may terminate use of device A and thereby terminate API access on device A.

In an alternative branch 906, a user can continue use of device A; and initiate use of device B. This alternative branch may include a sub-branch wherein a user terminates his API access on device A, and initiates API access on device B 908. Dual API access on device A and B may be useful for a user when a user needs heightened access to an API or, alternatively, when a user needs to interact between one access point within the API and a different access point within the API, such as for inter-API communication.

In a different sub-branch 910 the user may continue API access on device A. At 912, the user may initiate API access on device B and maintain a dual AP access on devices A and B. Alternatively, the user may maintain API access only on device A and not initiate API access on device B.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer readable data structures.

Thus, methods and systems for an adaptive, multi-channel, embedded application programming interface (API) are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for conducting an electronic communication between a multi-channel, embedded application programming interface (API), said API that provides adaptive API access across multiple channels, and a mobile device, the API comprising a library of operating system (OS) communication protocols, each of said OS protocols corresponding to a single one of the multiple channels, a library of user credentials for verifying authenticity of a single user attempting to log in via one of the multiple channels, and a library of data, said data that provides information for one or more responses to a request from the user, following verification of the authenticity of the user, and the method comprising:

receiving, at the API, a communication initiation from the device associated with the user, wherein the device is associated with a first channel among the multiple channels;

requesting, using the API, an OS format associated with the device and user credentials associated with the device;

receiving a response from the device, the response comprising a device OS format, credentials associated with the device and a data request;

accessing, using the API, the library of OS communication protocols to retrieve a protocol that corresponds to the OS format;

authenticating the user credentials;

following the authenticating, pulling the requested data;

formatting the pulled data in the OS format to form OS formatted data, and providing the OS formatted data to the mobile device.

2. The method of claim 1 further comprising transitioning API access from the mobile device to a second device in response to receiving user termination of API access on the mobile device.

3. The method of claim 1 further comprising maintaining API access from the mobile device simultaneous to initiating API access from a second user device, wherein each of the mobile device and the second user device are associated with the single user.

4. The method of claim 1 further comprising terminating API access from the mobile device in response to receiving an initiation communication from a second user device, said initiation communication for initiating API access from the second user device, each of the mobile device and the second user device associated with the single user.

5. The method of claim 1 further comprising terminating API access from the mobile device in response to granting API access to a second user device, wherein each of the mobile device and the second user device are associated with the single user.

6. The method of claim 1, enabling electronic communication between a first API instance and a second API instance, the first API instance associated with the mobile device and the second API instance associated with a second user device, each of the mobile device and the second user device associated with the single user.

* * * * *